United States Patent [19]

Sprunger

[11] Patent Number: 5,210,386
[45] Date of Patent: May 11, 1993

[54] DEVICE FOR MAKING AND WARMING COFFEE BY A MICROWAVE HEATING DEVICE

[76] Inventor: Powell L. Sprunger, 20 Woodview La., Algonquin, Ill. 60102

[21] Appl. No.: 588,248

[22] Filed: Sep. 26, 1990

Related U.S. Application Data

[63] Continuation-in-part of Ser. No. 513,715, Apr. 24, 1990, abandoned.

[51] Int. Cl.$^5$ .............................................. H05B 6/80
[52] U.S. Cl. ...................... 219/10.55 E; 219/10.55 A; 99/288; 99/DIG. 14
[58] Field of Search ................. 219/10.55 R, 10.55 A, 219/10.55 E, 10.55 F, 10.65; 99/280, 305, 310, 313, DIG. 14, 451, 288

[56] References Cited

U.S. PATENT DOCUMENTS

| | | | |
|---|---|---|---|
| 3,495,648 | 2/1970 | Amadon | 219/10.65 |
| 3,757,669 | 9/1973 | Holstein et al. | 99/280 |
| 3,891,817 | 6/1975 | Brown | 219/10.55 R |
| 4,313,798 | 2/1982 | Meyer, Jr. | 219/10.55 R |
| 4,642,443 | 2/1987 | Jorgensen et al. | 219/10.55 E |
| 4,694,133 | 9/1987 | Le Viet | 219/10.55 A |
| 4,825,758 | 5/1989 | Snowball et al. | 99/305 |
| 4,858,523 | 8/1989 | Helbling | 99/280 |
| 4,900,886 | 2/1990 | Bridges | 219/10.55 E |
| 5,012,059 | 4/1991 | Boatman | 219/10.55 E |

*Primary Examiner*—Philip H. Leung
*Attorney, Agent, or Firm*—Powell L. Sprunger

[57] ABSTRACT

A device for making and warming coffee comprising, a first reservoir for holding a liquid, a second reservoir for holding brewed coffee, a microwave heating device for heating the liquid or coffee, a device for selectively pumping the liquid or coffee from the respective reservoir into the microwave oven, a receptacle for holding coffee grounds, a container for holding liquid, and a device for selectively pumping the heated liquid or coffee from the microwave heating device into the receptacle or container.

5 Claims, 2 Drawing Sheets

DEVICE FOR MAKING AND WARMING COFFEE BY A MICROWAVE HEATING DEVICE

CROSS REFERENCE TO RELATED APPLICATION

This application is a continuation in part of application Ser. No. 513,715, filed Apr. 24, 1990, abandoned.

BACKGROUND OF THE INVENTION

The present invention relates to devices for making or warming coffee.

In the past, coffee has been made by coffee makers, and the heated coffee has been stored in heated receptacles, such as glass containers. However, over a period of time, the coffee being heated becomes stale and undesirable for use. In the case of restaurants, when business is slow, the coffee may remain in the heated containers for an extended period of time, and when it is necessary for use, the stale coffee makes an adverse impression on the customer. On the contrary, if the coffee is discarded, then fresh coffee must be made on a periodic basis, requiring an excessive cost and amount of time. It would be desirable to make and warm coffee by a single device.

SUMMARY OF THE INVENTION

A principal feature of the present invention is the provision of an improved device for making and warming coffee of simplified construction.

The device of the present invention comprises, a first reservoir for retaining a liquid, a second reservoir for retaining brewed coffee, a microwave heating device for heating the liquid or coffee, means for selectively pumping the liquid or coffee from the respective reservoir into the microwave oven, a receptacle for holding coffee grounds, a container for holding liquid and means for selectively pumping heated liquid or coffee from the microwave heating device into the receptacle or container.

A feature of the invention is that the device makes heated coffee in a rapid and simplified manner which may be used shortly after being made.

Another feature of the invention is the microwave heating device subsequently heats the brewed coffee in a rapid and simplified manner when desired for later use.

Thus, a feature of the invention is that the coffee made by the device may be utilized as the coffer warmed by the device.

Another feature of the invention is that the coffee made by the device may be allowed to cool, and may be retained until it is desirable to heat the coffee.

Yet another feature of the invention is that the coffee is fresh when heated by the warming device.

Thus, a feature of the invention is that the device prevents spoilage of the coffee.

Another feature of the invention is that the heated or made coffee may be pumped into a cup ready for serving.

A feature of the invention is that the liquid or coffee may be repetitively heated and pumped through the microwave heating device.

Still another feature of the invention is the provision of a concentrate of coffee or tea which may be frozen.

Further feature of the invention will become more fully apparent in the following description of the embodiments of this invention and the present claims.

DESCRIPTION OF THE DRAWINGS

Figure 1:
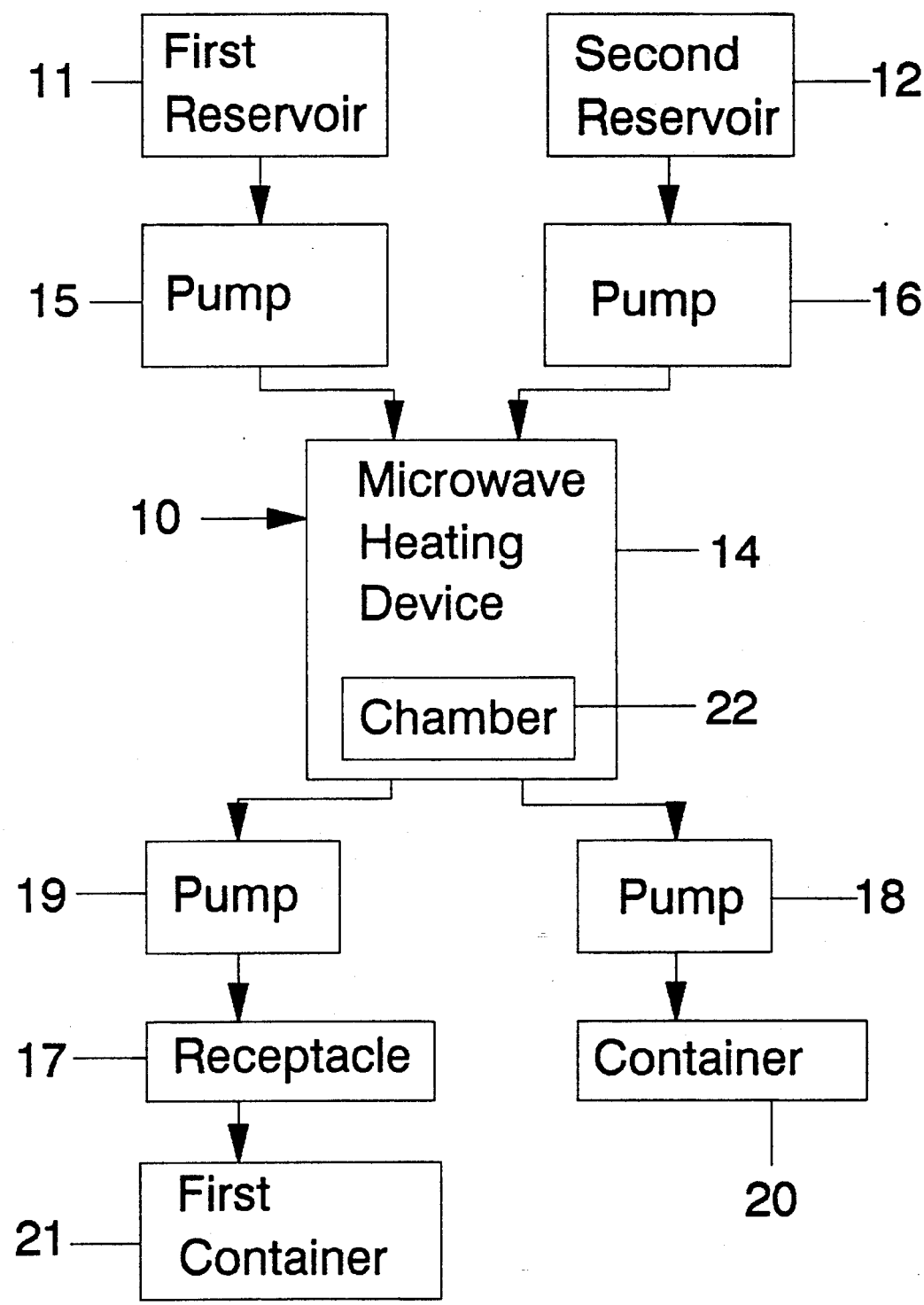
FIG. 1 is a diagrammatic view of a coffee maker or warmer of the present invention.

Referring now to FIG. 1, there is shown a coffee maker or warmer generally designated 10 having a first reservoir 11 for holding a liquid, such as water, a second reservoir 12 for holding a desired quantity of brewed coffee, a microwave heating device 14, such as a microwave heating device oven, a pump 15 for pumping the liquid from the first reservoir 11 into the microwave 14, a pump 16 for pumping coffee from the reservoir 12 into the microwave heating device, a receptacle 17 for holding coffee grounds, a pump 19 for pumping the heated liquid from the microwave heating device 14 into the receptacle 17 for making coffee where the brewed coffee passes to a first container 21, such as a glass container or cup for serving, and a pump 18 for pumping heated coffee from the microwave 14 into a container 20, such as a cup for serving. In a preferred form, the pumps 15 and 16 pump only a single cup from the reservoirs 11 and 12 into the microwave heating device 14, the pumps 18 and 19 pump only a single cup from the microwave heating device 14 into the cup 20 or container 21, and a chamber 22 of the microwave heating device is sized to only hold and heat a single cup of the liquid or coffee. Thus, the device 10 is sized and arranged to rapidly pump and heat the liquid or coffee from the reservoirs 11 or 12 to the cups 20 and 21, such that fresh coffee is available when needed. In a preferred form, the container 21 may comprise the second receptacle 12 for holding the brewed coffee.

Figure 2:
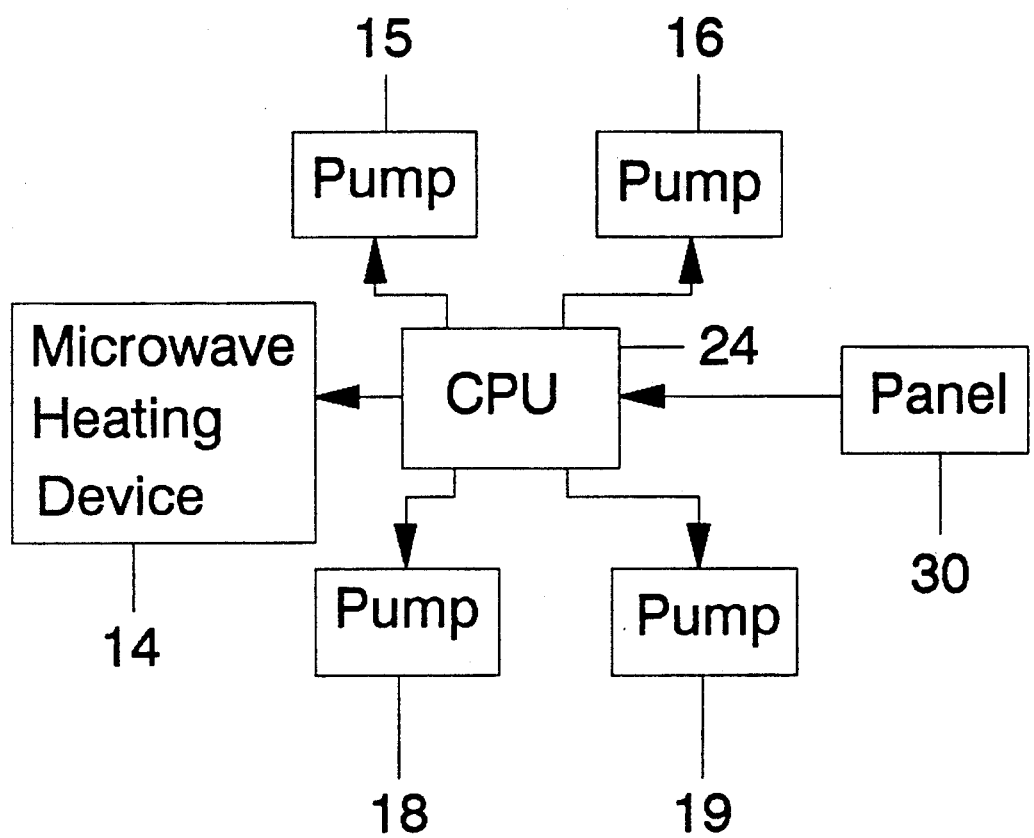
FIG. 2 is a block diagram of the coffee maker or warmer of the present invention.

A controller for the device 10 is illustrated in FIG. 2. The controller 24 has a central processing unit (CPU) being electrically connected to the microwave 14 for controlling the microwave heating device 14. The CPU is also electrically connected to the first pair of pumps 15 and 16 for controlling passage of the liquid and coffee from the first and second reservoir 11 and 12 into the microwave heating device 14, and the second pair of pumps 18 and 19 to control passage of the heated coffee from the microwave heating device 14 into the cup 20 or the heated liquid into the receptacle 17. The pumps 15, 16, 18, and 19 may comprise suitable valves. The controller 24 may have a panel 30 to select whether the water or coffee should be heated and the number of cups, in which case the CPU controls the microwave heating device 14 and pumps to repetitively pump and heat the water or coffee in the device from the reservoirs 11 and 12 to the receptacles or cups 20 or 21, where a desired quantity of heated coffee may be placed.

In accordance with the present invention, a beverage is provided for the device 10 in the form of a concentrate of coffee or tea. First, the coffee or tea is made in a suitable manner, and a liquid, such as water, is removed from the coffee or tea to form the concentrate which may be packaged and frozen. In use, a liquid, such as water, is added to the concentrate of coffee or tea which is then placed by the consumer in the second reservoir 12, and the device 10 is used to heat the coffee or tea for use.

The foregoing detailed description is given for clearness of understanding only, and no unnecessary limitations should be understood therefrom, as modifications will be obvious to those skilled in the art.

What is claimed is:

1. A device for making and warming coffee, comprising:

a first reservoir for holding a liquid;

a second reservoir for holding brewed coffee;

a microwave heating device being selectively connected to the first and second reservoirs and having a chamber for heating the liquid or coffee from the first or second reservoir;

means for selectively passing the liquid or coffee from the respective reservoir into the chamber of the microwave heating device where it is heated;

a receptacle being selectively connected to the chamber for holding coffee grounds for the microwave heating device;

a container being selectively connected to the chamber and having a cavity for holding liquid; and means for selectively passing the heated liquid or coffee from the microwave heating device into the receptacle or container.

2. The device of claim 1 wherein the container may be positioned to receive the coffee from the receptacle.

3. The device of claim 1 wherein the second reservoir comprises the container.

4. The device of claim 1 including means defining walls of the chamber in the microwave heating device to directly contact the liquid or coffee.

5. The device of claim 1 including a second container having a cavity to receive brewed coffee from the receptacle.

* * * * *